United States Patent
Jezierski, Jr. et al.

(10) Patent No.: US 12,512,522 B2
(45) Date of Patent: Dec. 30, 2025

(54) SYSTEMS AND METHODS FOR SELF-DERIVED AUXILIARY POWER FOR ENERGY STORAGE SYSTEMS

(71) Applicant: GE Grid GmbH, Frankfurt am Main (DE)

(72) Inventors: Chester Stanley Jezierski, Jr., Amsterdam, NY (US); Stephane Ouchouche, Rugby (GB); Owen Jannis Samuel Schelenz, Berlin (DE); Hariram Patel, Madhya Pradesh (IN)

(73) Assignee: GE GRID GMBH, Frankfurt (DE)

( * ) Notice: Subject to any disclaimer, the term of this patent is extended or adjusted under 35 U.S.C. 154(b) by 704 days.

(21) Appl. No.: 17/893,404

(22) Filed: Aug. 23, 2022

(65) Prior Publication Data
US 2024/0072317 A1    Feb. 29, 2024

(51) Int. Cl.
| | |
|---|---|
| *H01M 10/44* | (2006.01) |
| *H01M 10/663* | (2014.01) |
| *H01M 50/383* | (2021.01) |
| *H02J 7/00* | (2006.01) |
| *H02J 9/06* | (2006.01) |

(52) U.S. Cl.
CPC ....... *H01M 10/446* (2013.01); *H01M 10/441* (2013.01); *H01M 10/663* (2015.04); *H01M 50/383* (2021.01); *H02J 7/00034* (2020.01); *H02J 9/062* (2013.01)

(58) Field of Classification Search
CPC ............. H01M 10/446; H01M 10/663; H01M 50/383; H01M 10/441; H02J 7/00034; H02J 9/062

USPC .......................................................... 307/66
See application file for complete search history.

(56) References Cited

U.S. PATENT DOCUMENTS

| | | | |
|---|---|---|---|
| 10,153,641 B2 | 12/2018 | Schulz et al. | |
| 10,340,695 B2 | 7/2019 | Ren | |
| 2011/0175451 A1* | 7/2011 | Moon | H02J 9/062 307/66 |
| 2018/0248379 A1 | 8/2018 | Schulz et al. | |

(Continued)

FOREIGN PATENT DOCUMENTS

| | | |
|---|---|---|
| CN | 113629757 A | 11/2021 |
| EP | 4199295 A1 | 6/2023 |

OTHER PUBLICATIONS

PCT International Search Report and Written Opinion, Application No. PCT/US2023/030798, dated Jan. 10, 2024, 15 pages.

*Primary Examiner* — Michael R. Fin
(74) *Attorney, Agent, or Firm* — Armstrong Teasdale LLP

(57) ABSTRACT

A battery energy storage system (BESS) is provided. The BESS includes a plurality of battery strings, a plurality of battery switchgear units, an internal power supply configured to supply DC power from within the BESS, and a controller coupled in communication with the plurality of battery switchgear units and electrically coupled to the internal power supply. The controller is configured to receive DC power from the internal power supply, instruct at least one battery switchgear unit of the plurality of battery switchgear units to electrically couple at least one battery string of the plurality of battery strings to a DC bus, receive DC power from the at least one battery string via the DC bus, and instruct each battery switchgear unit of the plurality of battery switchgear units to electrically couple each battery string of the plurality of battery strings to the DC bus.

20 Claims, 3 Drawing Sheets

(56) References Cited

U.S. PATENT DOCUMENTS

| | | |
|---|---|---|
| 2020/0153351 A1* | 5/2020 | Jiao .................. H02J 7/0018 |
| 2021/0066912 A1 | 3/2021 | Mitsunaga et al. |
| 2021/0111558 A1 | 4/2021 | Yang et al. |
| 2021/0234369 A1* | 7/2021 | Aufderhar ............. H02J 3/0073 |
| 2022/0408604 A1* | 12/2022 | Neuman ............ H05K 7/20745 |
| 2024/0136850 A1* | 4/2024 | Yu .................... H02J 3/0012 |

* cited by examiner

SYSTEMS AND METHODS FOR SELF-DERIVED AUXILIARY POWER FOR ENERGY STORAGE SYSTEMS

BACKGROUND

The field of the invention relates generally to auxiliary power systems for battery energy storage systems, and more particularly, to systems for providing self-derived auxiliary power for a battery energy storage system (BESS).

A BESS generally includes a plurality of batteries and a bi-directional inverter though which direct current (DC) energy storage devices such as batteries may be electrically connected to an alternating current (AC) external system, such as a power grid. Accordingly, the BESS may be used to temporarily store energy produced by renewable power sources (e.g., photovoltaic (PV) sources and/or wind turbines). For example, when the BESS is coupled to a PV field or wind turbine and/or otherwise connected to equipment that can produce electrical power in excess of the grid requirement (e.g., a PV field on a sunny day or a wind turbine on a windy day), the excess power can be used to charge the BESS batteries. Conversely, when the grid requires power greater than what is provided by the renewable sources, the BESS batteries may be discharged to provide power to the grid.

A BESS requires auxiliary electrical power to start and run. This auxiliary power may be used to power, for example, control systems, heating, ventilation, and air conditioning (HVAC) and/or other climate control systems, fire suppression systems, exhaust systems, fans, lights, and/or other auxiliary components that may be necessary for safe operation of the BESS. This power is generally obtained from the grid, a diesel generator, shore power, and/or some other external power source. Providing this external auxiliary power requires additional equipment such as an auxiliary transformer, a diesel generator, or a shore power electrical circuit. This need for external auxiliary power also prevents the BESS from being used in applications where such external power is unavailable, impractical, and/or cost prohibitive. A BESS capable of starting and/or supplying auxiliary power without an external power source is therefore desirable.

BRIEF DESCRIPTION

In one aspect, a BESS is provided. The BESS includes a plurality of battery strings. Each battery string of the plurality of battery strings includes at least one battery. The BESS further includes a plurality of battery switchgear units configured to respectively selectively couple one of the plurality of battery strings to a DC bus. The BESS further includes an internal power supply configured to supply DC power from within the BESS. The BESS further includes a controller coupled in communication with the plurality of battery switchgear units and electrically coupled to the internal power supply. The controller is configured to receive DC power from the internal power supply. The controller is further configured to, in response to receiving DC power from the internal power supply, instruct at least one battery switchgear unit of the plurality of battery switchgear units to electrically couple at least one battery string of the plurality of battery strings to the DC bus. The controller is further configured to in response to the at least one battery string of the plurality of battery strings being electrically coupled to the DC bus, receive DC power from the at least one of the plurality of battery strings via the DC bus. The controller is further configured to, in response to the at least one battery string of the plurality of battery strings being electrically coupled to the DC bus, instruct each battery switchgear unit of the plurality of battery switchgear units to electrically couple each battery string of the plurality of battery strings to the DC bus.

In another aspect, a method for startup control of a BESS is provided. The BESS includes a plurality of battery strings. Each battery string of the plurality of battery strings includes at least one battery. The BESS further includes a plurality of battery switchgear units configured to respectively selectively couple one of the plurality of battery strings to a DC bus, an internal power supply configured to supply DC power from within the BESS, and a controller coupled in communication with the plurality of battery switchgear units and electrically coupled to the internal power supply. The method includes receiving, by the controller, DC power from the internal power supply. The method further includes, in response to receiving DC power from the internal power supply, instructing, by the controller, at least one battery switchgear unit of the plurality of battery switchgear units to electrically couple at least one battery string of the plurality of battery strings to the DC bus. The method further includes, in response to the at least one battery string of the plurality of battery strings being electrically coupled to the DC bus, receiving, by the controller, DC power from the at least one of the plurality of battery strings via the DC bus. The method further includes, in response to the at least one battery string of the plurality of battery strings being electrically coupled to the DC bus, instructing, by the controller, each battery switchgear unit of the plurality of battery switchgear units to electrically couple each battery string of the plurality of battery strings to the DC bus.

In another aspect, a controller for a BESS is provided. The BESS includes a plurality of battery strings. Each battery string of the plurality of battery strings including at least one battery. The BESS further includes a plurality of battery switchgear units configured to respectively selectively couple one of the plurality of battery strings to a DC bus and an internal power supply configured to supply DC power from within the BESS. The controller is coupled in communication with the plurality of battery switchgear units and electrically coupled to the internal power supply, and is configured to receive DC power from the internal power supply. The controller is further configured to, in response to receiving DC power from the internal power supply, instruct at least one battery switchgear unit of the plurality of battery switchgear units to electrically couple at least one battery string of the plurality of battery strings to the DC bus. The controller is further configured to, in response to the at least one battery string of the plurality of battery strings being electrically coupled to the DC bus, receive DC power from the at least one of the plurality of battery strings via the DC bus. The controller is further configured to, in response to the at least one battery string of the plurality of battery strings being electrically coupled to the DC bus, instruct each battery switchgear unit of the plurality of battery switchgear units to electrically couple each battery string of the plurality of battery strings to the DC bus.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
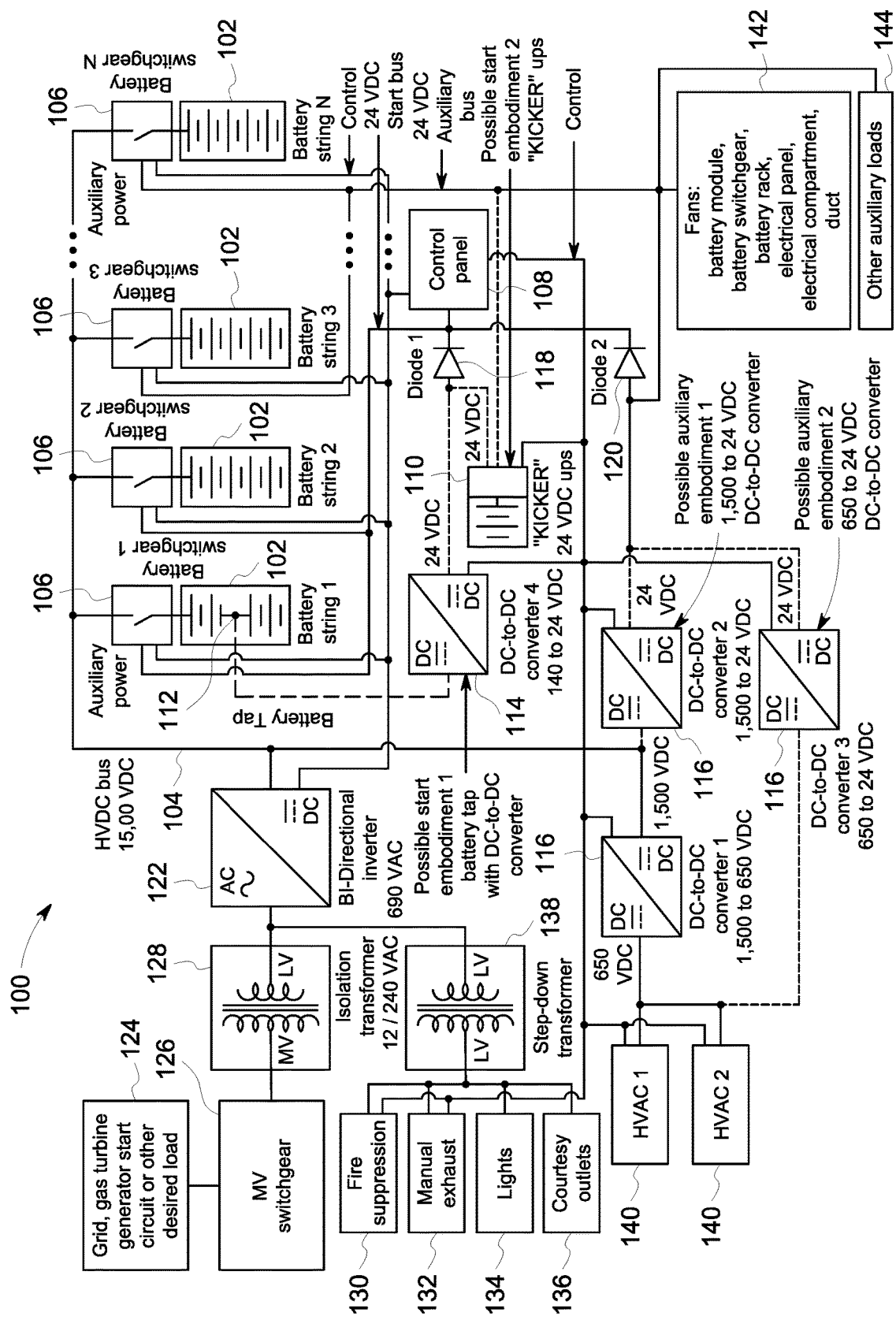
FIG. 1 is a block diagram of an example BESS.

In the following specification and the claims, reference will be made to a number of terms, which shall be defined to have the following meanings.

The singular forms "a", "an", and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "about," "substantially," and "approximately," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

The embodiments described herein include a BESS that includes a plurality of battery strings. Each battery string includes at least one battery and battery switchgear configured to selectively couple the at least one battery to a DC bus. The BESS further includes a power supply configured to supply DC power from within the BESS. In other words, the power supply is not external to the BESS. The power supply may be, for example, an uninterruptible power supply (UPS) including a battery, used as a "kicker" to provide initial power, or a direct tap to one of the battery strings.

The BESS further includes a controller coupled in communication with the battery switchgear units and electrically coupled to the internal power supply. When a startup process of the BESS without using external power (referred to herein as a "black start") is initiated, the controller is configured to receive DC power from the internal power supply. Because the controller may be powered by the internal power supply, no external power source is needed to initiate a startup of the BESS.

When the controller is powered, the controller is configured to instruct at least one of the battery switchgear units to electrically couple at least one of the battery strings to the DC bus, providing some DC power to the DC bus. The controller may then receive DC power from the at least one battery strings via the DC bus and, for example, a DC to DC converter. Once power is received by the controller from the DC bus, the controller is configured to instruct each battery switchgear unit to electrically couple the remaining strings to the DC bus, so that the DC bus is fully powered. The controller may then activate the various auxiliary components (e.g., HVAC systems) of the BESS, which may receive power from the battery strings. The BESS may further include a bidirectional inverter for supplying power to and/or receiving power from a grid and/or another external source and/or load, and may include additional transformers and/or power converters (e.g., DC to DC and/or AC to DC power converters) for distributing power to the auxiliary components as appropriate.

FIG. 1 is a block diagram illustrating an example battery energy storage system (BESS) 100. BESS 100 includes a plurality of battery strings 102, a DC bus 104, and a plurality of battery switchgear units 106 each electrically coupled between one of battery strings 102 and DC bus 104 and configured to open and close to selectively electrically couple the respective battery string 102 to DC bus 104. When battery strings 102 are coupled to DC bus 104, battery strings 102 may supply DC power via DC bus 104. BESS 100 further includes a controller 108 coupled in communication with battery switchgear units 106 and configured to instruct battery switchgear units 106 to open and close to selectively couple battery strings 102 to DC bus 104.

BESS 100 further includes an internal power supply configured to supply DC power to controller 108 from a source within BESS 100, enabling the power supply to power controller 108 during a black start event without receiving external power and prior to an activation of BESS 100. For example, in some embodiments, BESS 100 includes a "kicker" uninterruptible power supply (UPS) 110. UPS 110 is configured to supply DC power (e.g., 24 volt DC power) to controller 108 and includes a battery and/or other power source, so that UPS 110 may supply power to controller 108 during a black start event without receiving external power and prior to an activation of BESS 100. Alternatively, in some embodiments, one or more of battery strings 102 includes a direct tap 112 from which DC power may be supplied to controller 108. In such embodiments, BESS 100 may include a tap DC to DC converter 114 electrically coupled between direct tap 112 and controller 108 to convert the DC voltage provided by direct tap 112 to a voltage suitable for powering controller 108 (e.g., 24 volts DC). By receiving power from UPS 110, direct tap 112, and/or another power supply, controller 108 may control a startup process (e.g., coupling battery strings 102 to DC bus 104 and/or providing power to auxiliary components of BESS 100) without a need for power supply from an external source.

When performing a black start, battery switchgear units 106 are initially open, and DC bus 104 is not powered (e.g., by battery strings 102). Controller 108, which may be powered by, for example, UPS 110 and/or direct tap 112, is configured to instruct at least one battery switchgear unit 106 to close, so that the corresponding battery string 102 supplies DC power to DC bus 104. Because fewer than all of battery strings 102 are coupled to DC bus 104, the power available at DC bus 104 may be less than the power available during full operation, yet sufficient to power controller 108 and other components necessary to continue startup of BESS 100.

For example, in some embodiments, controller 108 is configured to receive power from DC bus 104 via one or more auxiliary DC to DC converters 116, which are configured to convert the DC voltage of DC bus 104 (e.g., 1500 volts DC) to a voltage suitable for controller 108 (e.g., 24 volts DC). In some such embodiments, in which multiple auxiliary DC to DC converters 116 are used in succession, the DC voltage may be converted to one or more intermediate voltages (e.g., 650 volts DC) before being converted to a voltage suitable for controller 108. In some embodiments, tap DC to DC converter 114 or UPS 110 supplying power to controller 108 is coupled to controller 108 via an OR-ing/blocking diode 118, which is forward biased and initially supplies power to controller 108. When DC bus 104 is energized, it energizes auxiliary DC-to-DC converters 116. Auxiliary DC-to-DC converters 116 are adjusted to have a slightly higher output voltage (for example, 0.5 or 1.0 volt higher) than tap DC to DC converter 114 or UPS 110, so that OR-ing/blocking diode 120 is forward biased and OR-ing/blocking diode 118 is reverse biased, which causes OR-ing/ blocking diode 120 to conduct and OR-ing/blocking diode 118 to stop conducting. This transfers the supply of power to controller 108 from tap DC to DC converter 114 or UPS 110 to auxiliary DC-to-DC converters 116. Another function of OR-ing/blocking diode 118 and OR-ing/blocking diode 120 is to act as blocking diodes to prevents any undesired flow of current between tap DC to DC converter 114 or UPS 110 and auxiliary DC to DC converters 116. After DC bus 104 is fully powered by all battery strings 102, UPS 110, if it is used, recharges its internal battery from the 24 volts DC (or other appropriate voltage) auxiliary bus.

BESS 100 further includes a bi-directional inverter 122 electrically coupled to DC bus 104, through which power may be transferred between battery strings 102 and an external source or load 124. For example, bi-directional inverter 122 may convert DC power provided by battery strings 102 to AC power to provide to a load, and/or bi-directional inverter 122 may convert AC power provided by an external source to DC power for charging battery strings 102. In some embodiments, BESS 100 further includes switchgear 126 configured to selectively electrically couple bi-directional inverter 122 from source or load 124, and an isolation transformer 128 electrically coupled between bi-directional inverter 122 and switchgear 126 and configured to isolate bi-directional inverter 122 and source or load 124 and to provide appropriate voltage conversion between bi-directional inverter 122 and source or load 124.

BESS 100 further includes various auxiliary components, at least some of which may be coupled in communication with and controlled by controller 108. In some embodiments, certain auxiliary components, such as fire suppression system 130, manual exhaust 132, lights 134, and/or courtesy outlets 136 are configured to receive AC power, for example, via bi-directional inverter 122. In some such embodiments, BESS 100 further includes a step-down transformer 138, through which these auxiliary components are coupled to bi-directional inverter 122. Other auxiliary components such as, for example, HVAC systems 140, fans 142, and/or other auxiliary loads 144, may receive DC power, for example, from DC bus 104 via one of more of auxiliary DC to DC converters 116. Accordingly, BESS 100 may self-power its auxiliary components by providing power from battery strings 102. For example, HVAC systems 140 may be used to maintain temperature and humidity within BESS 100 during transportation and storage, and may be configured to transmit temperature and humidity data to controller 108. Further, because battery strings 102 may supply power to the auxiliary components when a supply of power from the grid is interrupted, unreliable, or not present, BESS 100 is capable of providing low voltage ride through (LVRT), zero voltage ride though (ZVRT) and/or UPS functionality, though which the auxiliary components may remain powered during such conditions.

Controller 108 is coupled in communication with the auxiliary components (e.g., fire suppression system 130, manual exhaust 132, lights 134, HVAC systems 140, fans 142, and/or other auxiliary loads 144), and may selectively activate and/or deactivate these components. For example, during a black start process, controller 108 may be configured to activate one or more of the auxiliary systems once each of battery strings 102 is coupled to DC bus 104 and sufficient power may be provided from battery strings 102 to power the auxiliary components to be activated. In some embodiments, controller 108 is configured to monitor a power consumption of the auxiliary components and available power (e.g., from battery strings 102 and/or a grid to which BESS 100 is coupled), and may selectively activate and/or deactivate these components based on the power consumption and/or available power to reduce and/or minimize power draw from battery strings 102. In some embodiments, controller 108 is configured to monitor a state of charge of battery strings 102 and generate alerts so that the state of charge does not fall below a safe limit.

Figure 2:
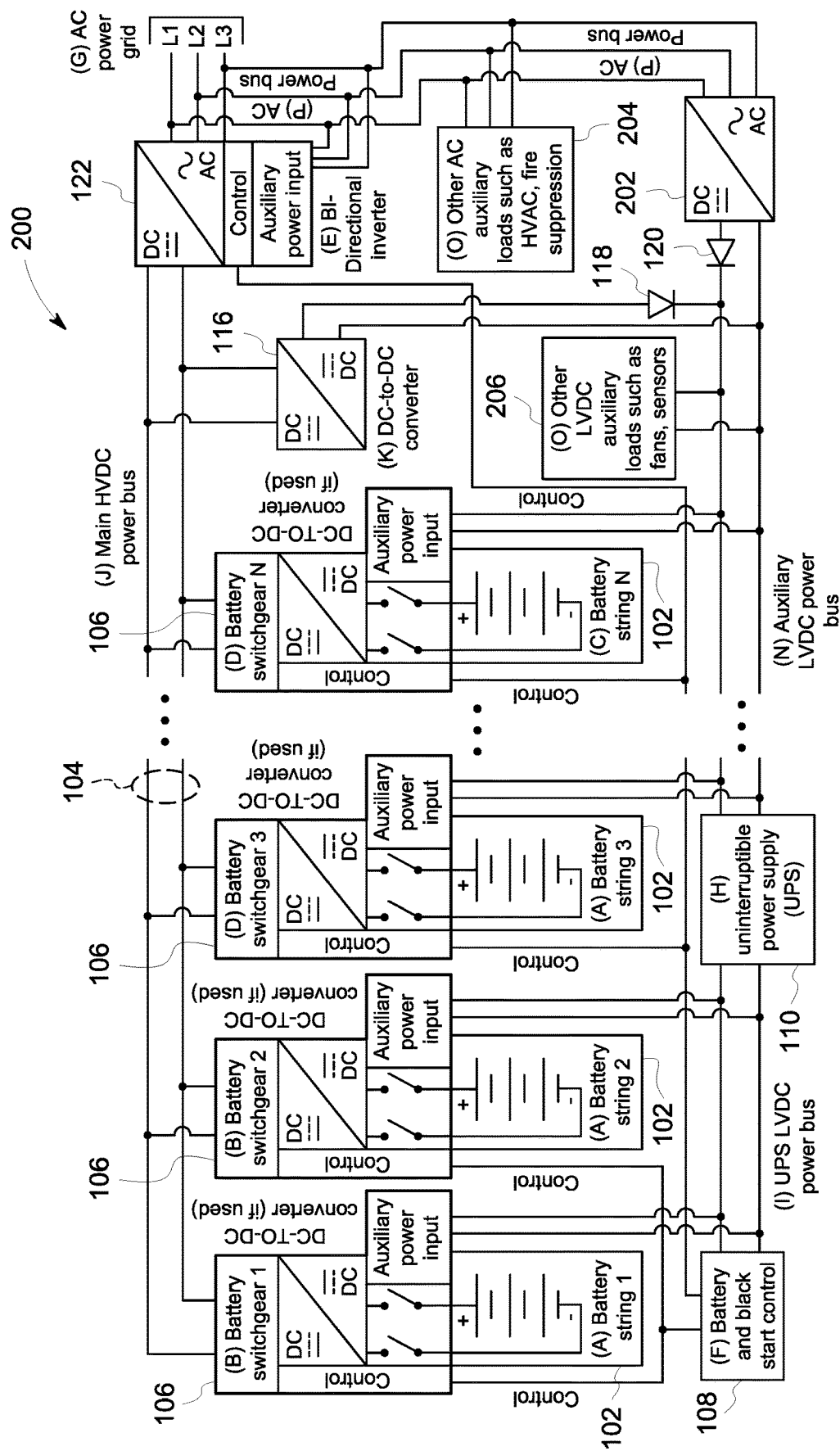
FIG. 2 is a block diagram of another example BESS.

FIG. 2 is a block diagram illustrating another example BESS 200. BESS 200 includes battery strings 102, DC bus 104, battery switchgear units 106, controller 108, UPS 110, auxiliary DC to DC converter 116, OR-ing/blocking diodes 118 and 120, and bi-directional inverter 122, which generally function as described with respect to FIG. 1. BESS 200 further includes an auxiliary power supply 202 configured to convert AC power (e.g., from a grid and/or output bi-directional inverter 122) to DC power. During a black start, controller 108 and at least one battery switchgear unit 106 of the plurality of battery switchgear units are initially powered from UPS 110. After BESS 200 has fully started, UPS 110 recharges its internal battery from DC-to-DC converter 116 through OR-ing/blocking diode 118 or from auxiliary power supply 202 through OR-ing/blocking diode 120. UPS 110 also passes auxiliary power from DC-to-DC converter 116 or from auxiliary power supply 202 to controller 108 and to the at least one battery switchgear unit 106 that are connected to it. BESS 200 further includes AC auxiliary components 204 (e.g., HVAC and/or fire suppression), which are configured to receive AC power from bi-directional inverter 122, and DC auxiliary components 206 (e.g., fans and/or sensors), which are configured to received DC power from auxiliary power supply 202 and/or DC to DC converter 116.

Figure 3:
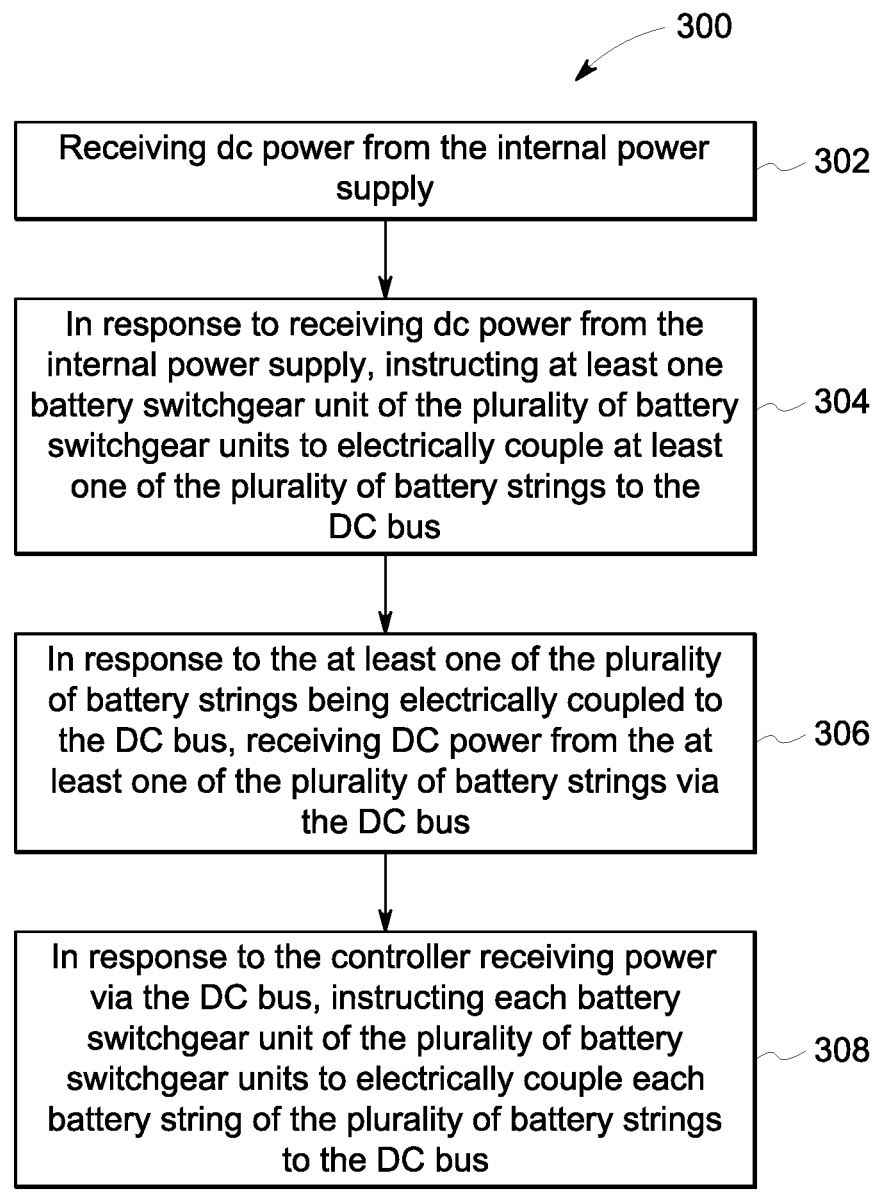
FIG. 3 is a flowchart of an example method for startup of a BESS.

FIG. 3 is a flowchart illustrating an example method 300 for startup control a BESS such as BESS 100 (shown in FIG. 1). The BESS including a plurality of battery strings (such as battery strings 102), each including at least one battery. The BESS further includes a plurality of battery switchgear units (such as battery switchgear units 106) configured to respectively selectively couple one of the plurality of battery strings to a DC bus (such as DC bus 104). The BESS further includes an internal power supply (such as UPS 110 and/or direct tap 112) configured to supply DC power from within the BESS. The BESS further includes a controller (such as controller 108) coupled in communication with the plurality of battery switchgear units and electrically coupled to the internal power supply.

Method 300 includes receiving 302, by the controller, DC power from the internal power supply. Method 300 further includes, in response to receiving DC power from the internal power supply, instructing 304, by the controller, at least one battery switchgear unit of the plurality of battery switchgear units to electrically couple at least one of the plurality of battery strings to the DC bus. Method 300 further includes, in response to the at least one of the plurality of battery strings being electrically coupled to the DC bus, receiving 306, by the controller, DC power from the at least one of the plurality of battery strings via the DC bus. Method 300 further includes, in response to the controller receiving power via the DC bus, instructing 308, by the controller, each battery switchgear unit of the plurality of battery switchgear units to electrically couple each battery string of the plurality of battery strings to the DC bus.

In some embodiments, the internal power supply is an uninterruptible power supply UPS (such as UPS 110).

In some embodiments, the internal power supply is a direct tap (such as direct tap 112) into at least one battery string of the plurality of battery strings.

In some embodiments, the BESS includes at least one HVAC system (such as HVAC systems 140) configured to regulate a temperature of at least a portion of the BESS. In some such embodiments, method 300 controller further includes, in response to the battery switchgear of each battery string being closed, activate the at least one HVAC system. In some embodiments, the BESS further includes at least one auxiliary DC to DC converter, wherein the HVAC system is electrically coupled to and configured to receive DC power from the DC bus via the at least one auxiliary DC to DC converter.

In some embodiments, the BESS further includes a bi-directional inverter (such as bi-directional inverter 122) electrically coupled to the DC bus and configured to convert DC power provided by the DC bus to AC power. In some such embodiments, the BESS further includes at least one of a fire suppression system and/or a manual exhaust system electrically coupled to and configured to receive AC power from the bi-directional inverter. In some embodiments, method 300 further includes, in response to the battery switchgear of each battery string being closed, activating the fire suppression system and/or the manual exhaust system. In some embodiments, the fire suppression system and/or the manual exhaust system are electrically coupled to the bi-directional inverter via a step down transformer.

In some embodiments, the BESS is not coupled to an external power source at least some of the time, and/or is capable of self-powering without being connected to an external power system.

An example technical effect of the methods, systems, and apparatus described herein includes at least one of: (a) an ability to self-start a BESS without connection to an external power source by using internal batteries to power a control system of the BESS; (b) an ability to self-power auxiliary systems of a BESS by using internal batteries to power the auxiliary systems; (c) improving battery lifetime within a BESS by regulating temperature and humidity during transportation and storage with an HVAC system powered by the BESS; and/or (d) reduced cost of constructing and/or installing a BESS by reducing a need for external power components.

Example embodiments of BESS are provided herein. The systems and methods are not limited to the specific embodiments described herein, but rather, components of systems and/or steps of the methods may be utilized independently and separately from other components and/or steps described herein. For example, the methods may also be used in combination with other electronic systems, and are not limited to practice with only the electronic systems, and methods as described herein. Rather, the example embodiments can be implemented and utilized in connection with many other electronic systems.

Some embodiments involve the use of one or more electronic or computing devices (e.g., controller 108). Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic controller (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above embodiments are examples only, and thus are not intended to limit in any way the definition and/or meaning of the term processor and processing device.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A battery energy storage system (BESS) comprising:
   a plurality of battery strings, each battery string of said plurality of battery strings comprising at least one battery;
   a plurality of battery switchgear units configured to respectively selectively couple one of said plurality of battery strings to a direct current (DC) bus;
   an internal power supply configured to supply DC power from within said BESS;
   a controller coupled in communication with said plurality of battery switchgear units and electrically coupled to said internal power supply, said controller configured to:
      receive DC power directly from said internal power supply, wherein the DC power received directly from said internal power supply is not transmitted via the DC bus;
      in response to receiving DC power from said internal power supply, instruct at least one battery switchgear unit of said plurality of battery switchgear units to electrically couple at least one battery string of said plurality of battery strings to the DC bus;
      in response to said at least one battery string of the plurality of battery strings being electrically coupled to the DC bus, receive DC power from said at least one of the plurality of battery strings via the DC bus without receiving further DC power from said internal power supply; and
      in response to said at least one battery string of the plurality of battery strings being electrically coupled to the DC bus, instruct each battery switchgear unit of said plurality of battery switchgear units to electrically couple each battery string of said plurality of battery strings to the DC bus.

2. The BESS of claim 1, wherein said internal power supply comprises an uninterruptible power supply (UPS).

3. The BESS of claim 1, wherein said internal power supply comprises a direct tap into at least one battery string of said plurality of battery strings.

4. The BESS of claim 1, further comprising at least one heating, ventilation, and air conditioning (HVAC) system configured to regulate a temperature of at least a portion of said BESS.

5. The BESS of claim 4, wherein said controller is further configured to, in response to said battery switchgear unit of each battery string being closed, activate said at least one HVAC system.

6. The BESS of claim 4, further comprising at least one auxiliary DC to DC converter, wherein said HVAC system is electrically coupled to and configured to receive DC power from the DC bus via said at least one auxiliary DC to DC converter.

7. The BESS of claim 1, further comprising a bi-directional inverter electrically coupled to the DC bus and configured to convert DC power provided by the DC bus to alternating current (AC) power.

8. The BESS of claim 7, further comprising at least one of a fire suppression system and/or a manual exhaust system electrically coupled to and configured to receive AC power from said bi-directional inverter.

9. The BESS of claim 8, wherein controller is further configured to, in response to said battery switchgear unit of each battery string being closed, activate said fire suppression system and/or said manual exhaust system.

10. The BESS of claim 8, wherein said fire suppression system and/or said manual exhaust system are electrically coupled to said bi-directional inverter via a step down transformer.

11. The BESS of claim 1, wherein said BESS is not coupled to an external power source.

12. A method for startup control of a battery energy storage system (BESS), the BESS including a plurality of battery strings, each battery string of the plurality of battery strings including at least one battery, a plurality of battery switchgear units configured to respectively selectively couple one of the plurality of battery strings to a direct current (DC) bus, an internal power supply configured to supply DC power from within the BESS, and a controller coupled in communication with the plurality of battery switchgear units and electrically coupled to the internal power supply, said method comprising:
receiving, by the controller, DC power directly from the internal power supply, wherein the DC power received directly from the internal power supply is not transmitted via the DC bus;
in response to receiving DC power from the internal power supply, instructing, by the controller, at least one battery switchgear unit of the plurality of battery switchgear units to electrically couple at least one battery string of the plurality of battery strings to the DC bus;
in response to the at least one battery string of the plurality of battery strings being electrically coupled to the DC bus, receiving, by the controller, DC power from the at least one of the plurality of battery strings via the DC bus without receiving further DC power from the internal power supply; and
in response to the at least one battery string of the plurality of battery strings being electrically coupled to the DC bus, instructing, by the controller, each battery switchgear unit of the plurality of battery switchgear units to electrically couple each battery string of the plurality of battery strings to the DC bus.

13. The method of claim 12, wherein the internal power supply includes an uninterruptible power supply (UPS).

14. The method of claim 12, wherein the internal power supply includes a direct tap into at least one battery string of the plurality of battery strings.

15. The method of claim 12, wherein the BESS further includes at least one heating, ventilation, and air conditioning (HVAC) system configured to regulate a temperature of at least a portion of the BESS.

16. The method of claim 15, further comprising, in response to the battery switchgear unit of each battery string being closed, activating, by the controller, the at least one HVAC system.

17. A controller for a battery energy storage system (BESS), the BESS including a plurality of battery strings, each battery string of the plurality of battery strings including at least one battery, a plurality of battery switchgear units configured to respectively selectively couple one of the plurality of battery strings to a direct current (DC) bus, and an internal power supply configured to supply DC power from within the BESS, said controller coupled in communication with the plurality of battery switchgear units and electrically coupled to the internal power supply, said controller configured to:
receive DC power directly from the internal power supply, wherein the DC power received directly from the internal power supply is not transmitted via the DC bus;
in response to receiving DC power from the internal power supply, instruct at least one battery switchgear unit of the plurality of battery switchgear units to electrically couple at least one battery string of the plurality of battery strings to the DC bus;
in response to the at least one battery string of the plurality of battery strings being electrically coupled to the DC bus, receive DC power from the at least one of the plurality of battery strings via the DC bus without receiving further DC power from the internal power supply; and
in response to the at least one battery string of the plurality of battery strings being electrically coupled to the DC bus, instruct each battery switchgear unit of the plurality of battery switchgear units to electrically couple each battery string of the plurality of battery strings to the DC bus.

18. The controller of claim 17, wherein the internal power supply includes an uninterruptible power supply (UPS).

19. The controller of claim 17, wherein the internal power supply includes a direct tap into at least one battery string of the plurality of battery strings.

20. The controller of claim 17, wherein the BESS further includes at least one heating, ventilation, and air conditioning (HVAC) system configured to regulate a temperature of at least a portion of the BESS, and wherein said controller is further configured to, in response to the battery switchgear unit of each battery string being closed, activate the at least one HVAC system.

* * * * *